Figure 1:
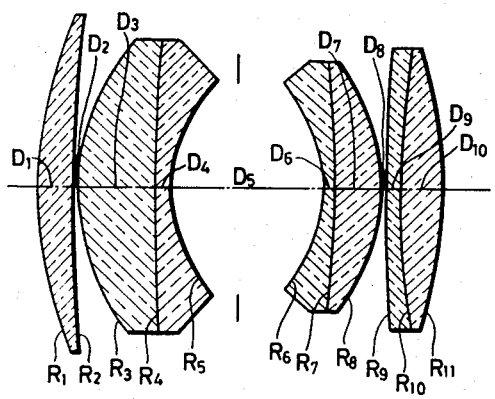
Figure 2A:
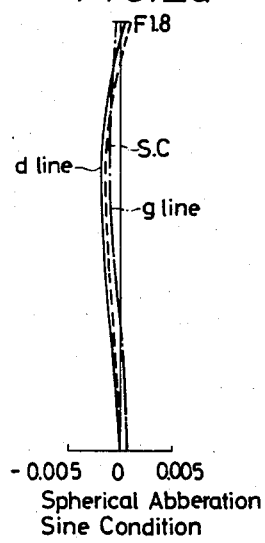
Figure 2B:
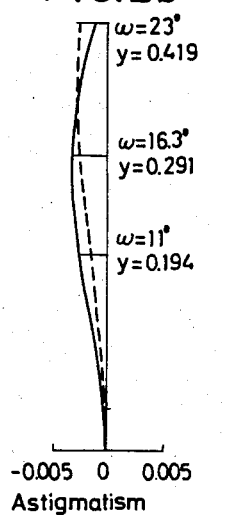
Figure 2C:
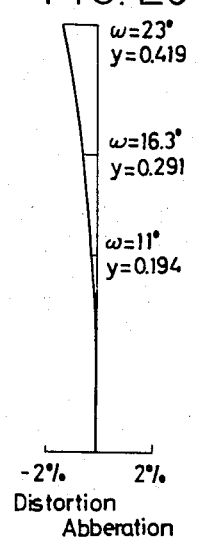
Figure 2D:
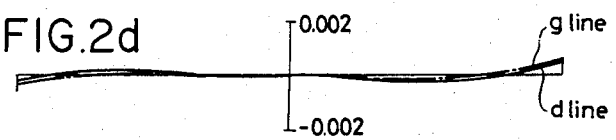

United States Patent
Momiyama

[11] 3,815,974
[45] June 11, 1974

[54] CAMERA LENS SYSTEM WITH MEANS FOR CORRECTING ABERRATIONS

[75] Inventor: Kikuo Momiyama, Tokyo, Japan

[73] Assignee: Canon Kabushiki Kaisha, Tokyo, Japan

[22] Filed: Aug. 17, 1973

[21] Appl. No.: 389,228

Related U.S. Application Data

[63] Continuation of Ser. No. 128,026, March 25, 1971, abandoned.

[30] Foreign Application Priority Data

Mar. 30, 1970 Japan .............................. 45-26028

[52] U.S. Cl. ................. 350/217, 350/222, 350/255
[51] Int. Cl. ........................... G02b 9/42, G02b 9/60
[58] Field of Search ............ 350/217, 222, 255, 184

[56] References Cited
UNITED STATES PATENTS

| | | |
|---|---|---|
| 2,503,789 | 4/1950 | Wood et al. ........................ 350/255 |
| 2,532,751 | 12/1950 | Baker ................................. 350/222 |
| 2,537,912 | 1/1951 | Reiss ............................. 350/255 UX |
| 2,735,339 | 2/1956 | Doi .................................... 350/217 |
| 3,020,804 | 2/1962 | Cox et al. ....................... 350/220 X |
| 3,473,866 | 10/1969 | Kirchhoff ....................... 350/255 X |
| 3,612,661 | 10/1971 | Determann ........................ 350/184 |

*Primary Examiner*—John K. Corbin
*Attorney, Agent, or Firm*—Toren and McGeady

[57] ABSTRACT

In the camera lens system disclosed aberrations occurring at large aperture ratios are corrected for close-up photography. The lens system includes two groups. A front convergent group includes a diaphragm and a rear group includes convergent lenses. The position of the entrance pupil relative to the rear group is movable towards the object when the camera focus is changed from more distant objects to closer objects. The distance between the front group and the rear group is also increased during this change of focus.

7 Claims, 28 Drawing Figures

Spherical Abberation
Sine Condition

Astigmatism

Distortion
Abberation

Lateral Abberation ($\omega=16.3°$)

Spherical Abberation
Sine Condition

Astigmatism

Distortion
Abberation

Lateral Abberation (y=0.291)

INVENTOR.
KIKUO MOMIYAMA
BY
Toren and McGeady
ATTORNEYS

-0.005 0 0.005
Spherical Abberation
Sine Condition

-0.005 0 0.005
Astigmatism

-2% 2%
Distortion
Abberation

Spherical Abberation
Sine Condition

Astigmatism

Distortion
Abberation

Lateral Abberation (y=0.291)

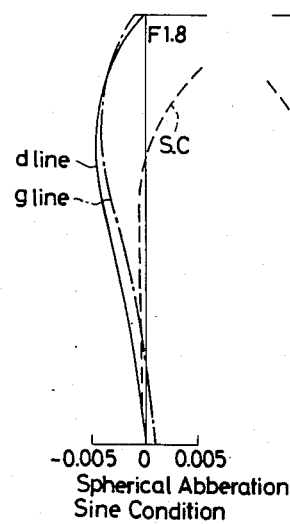
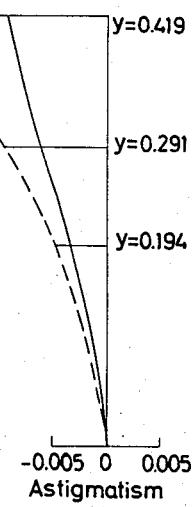
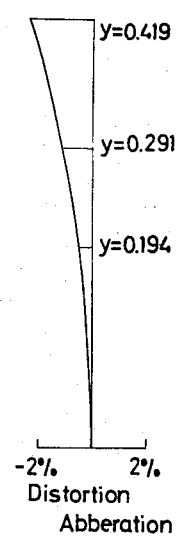
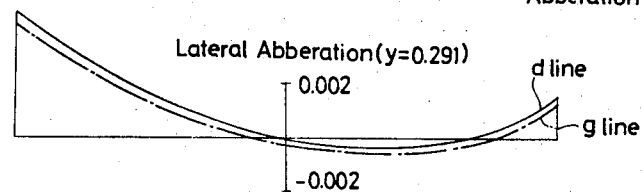

FIG.10a  FIG.10b  FIG.10c
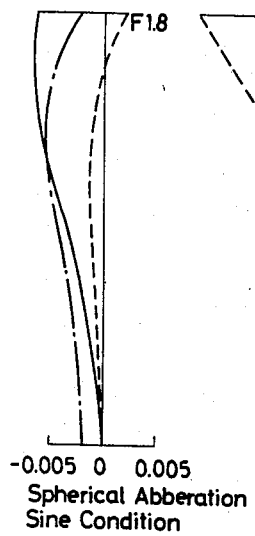
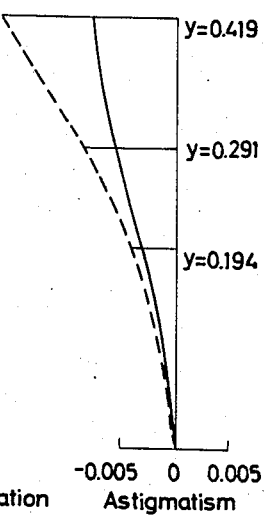
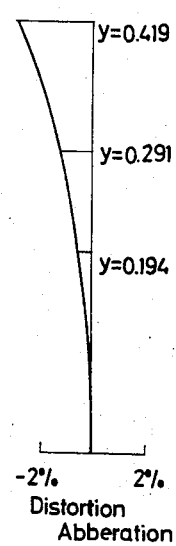
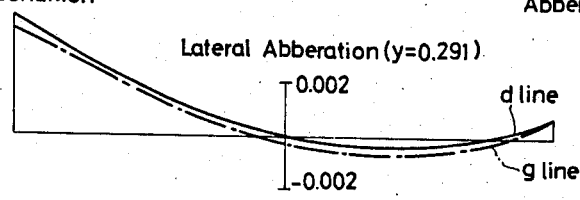
FIG. 10d

CAMERA LENS SYSTEM WITH MEANS FOR CORRECTING ABERRATIONS

This is a continuation of application Ser. No. 128,026 filed Mar. 25, 1971, now abandoned.

This invention relates to a camera lens system having large aperture ratios, and particularly to such systems having means for correcting aberrations within ranges suitable for close-up photography.

A common camera lens can be corrected for aberrations at a specific magnification. While such a lens can be used at other ranges of magnification, the correction of the aberration will change. A normal camera lens which has its aberration corrected when focused at infinity will exhibit a deterioration of the correction when the lens is focused to closer distances due to the change of aberration.

Hitherto, such deterioration has been accepted as an inevitable drawback. However, such deterioration cannot be ignored in photographic applications employing close-up photography and requiring high resolving power. The variation in aberration is dominated to a great extent by the type of lens. Aberrations tend to vary greatly with changes in focus in both retro-focus wide angle lenses and lenses having large aperture ratios.

A retro-focus wide angle lens is formed unsymmetrically and spaced widely between the principal plane and the pupil plane, so that it will cause a big change of astigmatism which will result in over-corrected astigmatism for the object in a range of close distance. In case, common camera lens having large aperture ratio and relatively symmetrical shape will cause change of astigmatism to a lesser extent than that of retro-focus type lens with wide angle. However, change of spherical aberration and coma aberration occur to a large extent resulting in tendencies such as a decrease in spherical aberration and an increase in coma aberration.

A hitherto known process corrects for change of aberration in retro-focus type lens with wide angle by shortening the distance between the front negative lens group and the rear positive lens group when focusing on a close object to cause astigmatism to decrease for correcting excess astigmatism at close distances. The foregoing process, however, which is effective for correcting change of astigmatism in a retro-focus wide-range lens is not suitable for correcting change of spherical aberration nor coma aberration in a camera lens having a large aperture ratio.

The object of the present invention is to provide a camera lens having large aperture ratio which is capable of avoiding change of aberration caused by change of magnification and which is suitable for photography in the range of distance by $\beta = 0 - 0.3$ in magnification.

The present invention corrects for change of spherical aberration as well as coma aberration occurring when a camera lens having large aperture ratio is focused at a close range.

The fundamental principle relating to the present invention lies in separating the lens system into a front convergent lens group having a diaphragm and a rear convergent lens group disposed at the image side and widening the distance between the front group and the rear group upon focusing on the object at a range of close distance according to the movement of the lens system. To correct the change of aberration due to the difference of magnification to the extent of $\beta = 0 - 0.3$ it is best to realize the condition of $0.10 < \Delta S/\Delta L \cdot f/fR < 0.20$, where the deviation amount of said distance is indicated by $\Delta S$, deviation amount of the front lens group referred to the image plane is denoted by $\Delta L$, the focal length of the rear lens group is designated by $fR$ and the focal length of the whole lens system is designated by $f$.

When the whole lens system is separated into the front and the rear convergent lens groups to be widened, the distance therebetween, coma aberration occurring in the rear convergent lens group is displaced towards the under-correct side due to the entrance pupil position being shifted away to the object side. As the front group comprises convergent lenses, upon widening the distance between the front group and the rear group, an axial ray entering into said rear lens group is subjected to pass through the lower position, thereby causing displacement of spherical aberration generated in the rear lens group toward the image side.

Accordingly in case of focusing at a range of close distance, undercorrected spherical aberration and over-corrected coma aberration, can be corrected at a range of close distance by means of shifting the lens while widening the distance between the front lens group and the rear lens group.

Changing the distance between the front and the rear lens groups is defined in relation to the focal length of the rear group of convergent lenses, that is, the shorter the focal length of the rear group of convergent lenses, the greater is the influence of distance change upon spherical aberration and coma aberration, so that it will be preferable to focusing on the object in the course of widening the distance under the condition $0.10 < \Delta S/\Delta L \cdot f/fR < 0.20$ for obtaining pertinent correction against change of aberration.

If the value of said condition, however, exceeds the upper limit, spherical aberration will be over-corrected and coma aberration will become undercorrected at the time of focusing on the object at a range of close distance while if the value is under the lower limit, spherical aberration will become under-corrected and coma aberration will be over-corrected.

The present invention will now be explained with reference to the accompanying drawings by way of example in the form of embodiments wherein:

FIG. 1 is a diagrammatic sketch of lens in a form of the first embodiment relating to the present invention showing the composition thereof, in the case, photographing at an infinity distance (magnification = 0).

FIGS. 2a, 2b, 2c, and 2d are diagrams of aberrations which occur in the system above.

Figure 3:
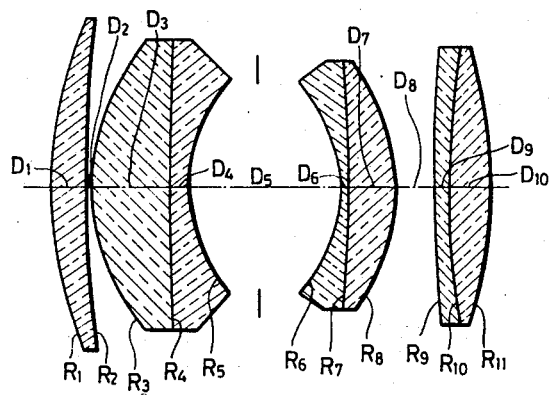
Figure 4A:
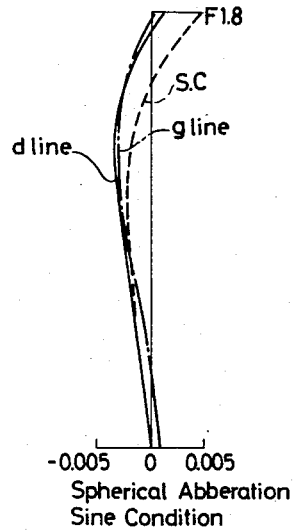
Figure 4B:
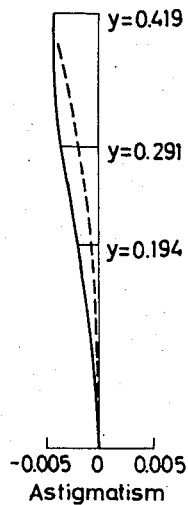
Figure 4C:
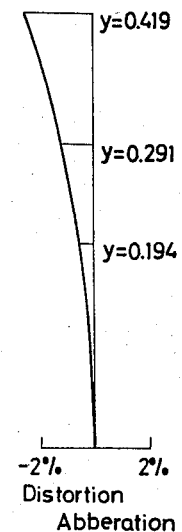
Figure 4D:
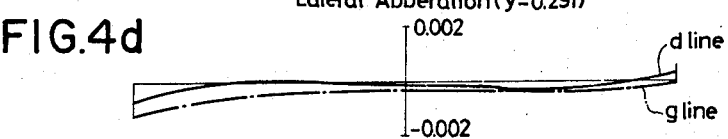

FIG. 3 is a diagrammatic sketch of lens section in the first embodiment in case the object distance from the image plane is 5.814 (magnification $\beta = 0.2715$).

FIGS. 4a, 4b, 4c, and 4d are aberrations which occur in the system above.

Figure 5:
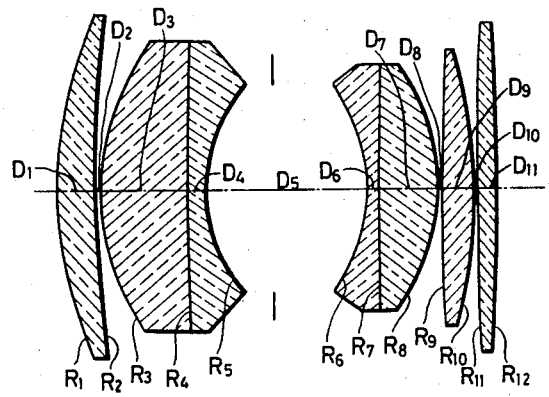
Figure 6A:
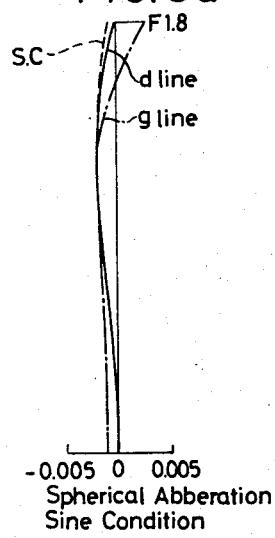
Figure 6B:
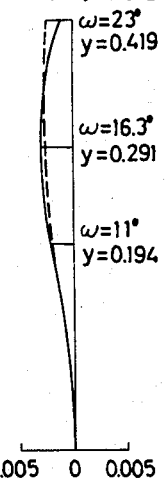
Figure 6C:
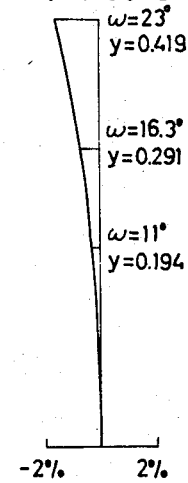
Figure 6D:
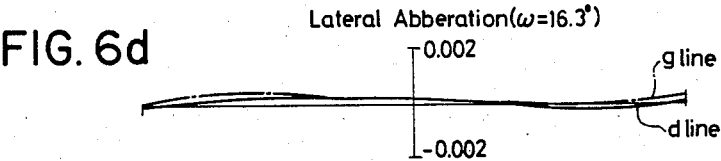

FIG. 5 is a diagrammatic sketch of lens section in a form of the second embodiment in case of photographing at an infinity distance.

FIGS. 6a, 6b, 6c, and 6d are diagrams of aberrations in the system above.

Figure 7:
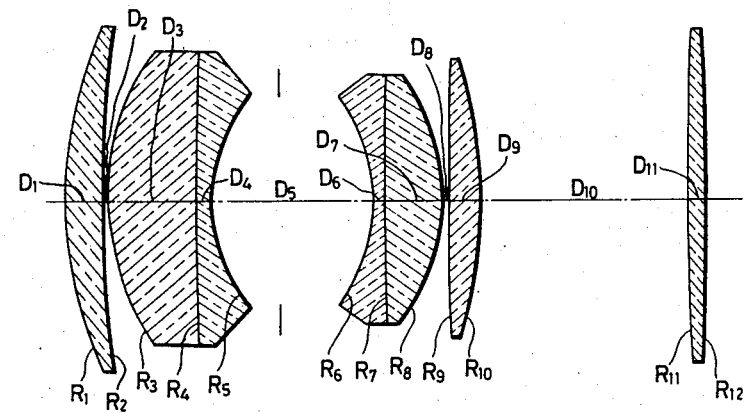
Figure 8A:
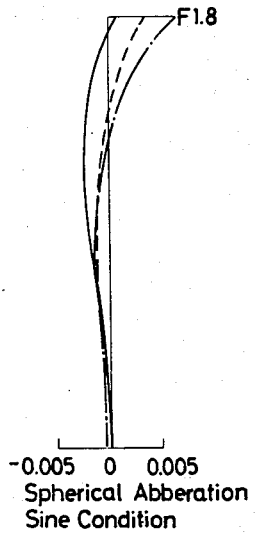
Figure 8B:
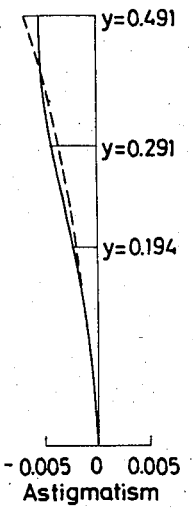
Figure 8C:
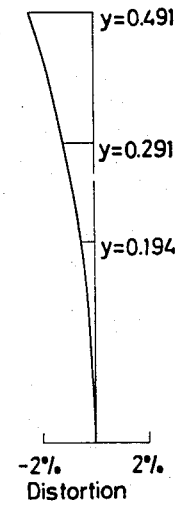
Figure 8D:
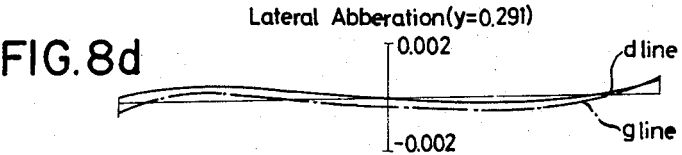

FIG. 7 is a diagrammatic sketch of lens section in the second embodiment for taking photograph in case the object distance is 5.814 (magnification $\beta = 0.2878$).

FIGS. 8a, 8b, 8c, and 8d are diagrams of aberrations in the system above.

FIGS. 9a, 9b, 9c, and 9d are diagrams showing aberrations when focusing on the object distance 5.814 (magnification $\beta = 0.2689$) without changing the interval between the front group and rear group in Example 1, and FIGS. 10a, 10b, 10c, and 10d are diagrams showing aberration when focusing on the object distance 5.814 (magnification $\beta = 0.26689$) without changing the distance between the front lens group and the rear lens group in example 2.

The first embodiment according to the present invention obtains the most efficient spherical and coma aberrations in a Gauss type lens by changing the distance between the rearmost cemented positive lens and the lens group ahead of said rearmost positive lens such that said distance is gradually widened for focusing on the object at a range of close distance corresponding to the condition of $\Delta S/\Delta L \cdot f/fR = 0.1705$. The Gauss type lens comprises two doublet negative meniscus lens components having their air exposed surfaces concave to a diaphragm between them, and a single positive lens arranged at the object side of the doublet negative meniscus lens component, and a positive lens cemented to a negative lens and a positive lens arranged at the image side. It is indispensable to form such mechanical composition as to be permissible to widen said distance to the extent of 0.1958 times corresponding to the shifting amount of the front group namely $\Delta S/\Delta L = 0.1958$. The ratio of changing amount of said space distance against the shifting amount of lens in the front group $\Delta S/\Delta L$ is requested to be larger in proportion to the prolongation for the focal length of lens of the rear group. As far as the focal length of the rear group be $5f - 10f$, change of aberration will be the most efficient in relation to the value of $\Delta S/\Delta L = 1.0$ whereby lens of the rear group will be fixed against the image plane.

The second embodiment of the present invention is constructed so that lenses of the rear group are fixed against the image plane for satisfying the condition of $\Delta S/\Delta L = 1$ and so that the most efficient correction of aberration in Gauss type lens is obtainable by changing the distance between the rearmost positive lens and the front lens group disposed to be ahead of said rearmost positive lens in such a manner that the distance is gradually widened for focusing on the object positioned at a range of close distance according to the formula of $\Delta S/\Delta L = 0.1549$ as well as to provide a long focal length of the rearmost lens so as to satisfy the condition in relation to the formula of $\Delta S/\Delta L = 1.0$. The Gauss type lens includes a two doublet negative meniscus lens component at a diaphragm which is surrounded by lenses of said component arranged in the front and at the rear of said diaphragm, and a single positive lens arranged at the object side positioned outside of the component, and two single positive lens as disposed at the image side.

According to the second embodiment, it is not necessary to make the distance between the front group and the rear group changeable by a certain ratio for focusing on the object. Rather for focusing on the object the rear group is fixed and only the front group is displaceable for focusing on the object.

A numerical example illustrating the foregoing embodiments of the present invention follows in the example.

R represents radius of curvature in sequence at each refracting surface;

D indicates thickness or air space in sequence on the axis of each lens;

N denotes refractive index in sequence against $d$ line of spectrum;

V designates Abbe's number in sequence of each lens.

Embodiment 1:
$f = 1$, F number $= 1.8$, $2w = 46°$

The front group
$R_1 = 0.72988$
$D_1 = 0.0678$, $N_1 = 1.80610$, $V_1 = 40.8$
$R_2 = 2.6389$
$D_2 = 0.0058$
$R_3 = 0.40665$
$D_3 = 0.1441$, $N_2 = 1.58144$, $V_2 = 40.7$
$R_4 = 5.9897$
$D_4 = 0.0291$, $N_3 = 1.75520$, $V_3 = 27.5$
$R_5 = 0.28127$
$D_5 = 0.2685$
$R_6 = 0.25991$
$D_6 = 0.0213$, $N_4 = 1.59270$, $V_4 = 35.4$
$R_7 = -2.5892$
$D_7 = 0.0858$, $N_5 = 1.80610$, $V_5 = 40.8$
$R_8 = -0.35318$
$D_8 = $ variable air space The rear group
$R_9 = 4.2685$
$D_9 = 0.0233$, $N_6 = 1.80518$, $V_6 = 25.4$
$R_{10} = 1.3057$
$D_{10} = 0.0775$, $N_7 = 1.69680$, $V_7 = 55.6$
$R_{11} = -0.90395$ Back focal length $= 0.69535$
focal length of the front group $= 2.58395$
focal length of the rear group $= 1.14810$ $\Delta S/\Delta L \times f/fR = 0.1705$, $\Delta S/\Delta L = 0.1958$, $\Delta S = 0.0652$

| Distance from the image plane to the object | 5.814 | |
|---|---|---|
| Magnification $\beta$ | 0 | 0.2715 |
| $D_x$ | 0.0019 | 0.0671 |
| Shifting length of the front group from the image plane | 0 | 0.3330 |

The following lists 1 and 2 indicate coefficient of Seidel's aberration respectively wherein the list 1 shows in case the object distance is $\infty$ and the list 2 shows in case the object distance is 5.814 (magnification $= 0.2715$).

List 1

| Surface number | I | II | III | P | V |
|---|---|---|---|---|---|
| 1 | 0.6355 | 0.1781 | 0.0499 | 0.6115 | 0.1853 |
| 2 | 0.0912 | −0.2495 | 0.6830 | −0.1691 | −1.4066 |
| 3 | 0.1306 | 0.0365 | 0.0102 | 0.9041 | 0.2555 |
| 4 | −0.4619 | 0.4377 | −0.4147 | 0.0105 | 0.3830 |
| 5 | −1.6862 | −0.6067 | −0.2183 | −1.5297 | −0.6289 |
| 6 | −3.6645 | 0.8449 | −0.1948 | −1.4318 | 0.3751 |

List 1

| Surface number | I | II | III | P | V |
|---|---|---|---|---|---|
| 7 | 0.0382 | 0.0854 | 0.1912 | −0.0287 | 0.3637 |
| 8 | 3.3324 | −0.3587 | 0.0386 | 1.2637 | −0.1402 |
| 9 | −0.0078 | 0.0457 | −0.2691 | 0.1045 | 0.9696 |
| 10 | 0.0001 | 0.0003 | 0.0010 | −0.0271 | −0.0908 |
| 11 | 1.8255 | −0.4263 | 0.0996 | 0.4543 | −0.1293 |
| ε | 0.2331 | −0.0127 | −0.0235 | 0.1622 | 0.1363 |

List 2

| Surface number | I | II | III | P | V |
|---|---|---|---|---|---|
| 1 | 0.7763 | 0.2199 | 0.0623 | 0.6252 | 0.1947 |
| 2 | 0.0065 | −0.0483 | 0.3614 | −0.1729 | −1.4109 |
| 3 | 0.3940 | 0.1113 | 0.0314 | 0.9224 | 0.2700 |
| 4 | −0.1913 | 0.2463 | −0.3171 | 0.0107 | 0.3946 |
| 5 | −2.3300 | −0.8330 | −0.2978 | −1.5640 | −0.6656 |
| 6 | −2.4954 | 0.6507 | −0.1697 | −1.4640 | 0.4260 |
| 7 | 0.1155 | 0.1853 | 0.2973 | −0.0293 | 0.4299 |
| 8 | 2.5711 | −0.3042 | 0.0360 | 1.2921 | −0.1572 |
| 9 | −0.0001 | −0.0024 | −0.0510 | 0.1068 | 1.1955 |
| 10 | −0.0055 | −0.0124 | −0.0279 | −0.0277 | −0.1253 |
| 11 | 1.3949 | −0.2330 | 0.0389 | 0.4645 | −0.0841 |
| ε | 0.2359 | −0.0198 | −0.0362 | 0.1659 | 0.4675 |

FIGS. 2a, 2b, 2c, and 2d and FIGS. 4a, 4b, 4c, and 4d show corrected aberrations relating to the first embodiment when the object distance is ∞ and is 5.814 respectively. It should be understood that the change of aberration becomes a minimum with variation of magnification. Furthermore it will clearly be understood that a change of aberration in the foregoing lens becomes minimum at close range when compared with the reference aberration shown in FIGS. 9a, 9b, 9c, and 9d which involves focusing on the object range 5.814 (in this case magnification comes to 0.2689) caused by integrally shifting the whole lens system as conventional manner without changing the distance between the front group and the rear group as shown in FIG. 1.

Embodiment 2:

$f = 1$, F number = 1.8, $2w = 46°$

The front group
$R_1 = 0.76737$
$D_1 = 0.0678$, $N_1 = 1.80610$, $V_1 = 40.8$
$R_2 = 2.6386$
$D_2 = 0.0058$
$R_3 = 0.46085$
$D_3 = 0.1527$, $N_2 = 1.59551$, $V_2 = 39.0$
$R_4 = 26.438$
$D_4 = 0.0291$, $N_3 = 1.71736$, $V_3 = 29.5$
$R_5 = 0.30997$
$D_5 = 0.2944$
$R_6 = -0.26919$
$D_6 = 0.0194$, $N_4 = 1.75520$, $V_4 = 27.5$
$R_7 = \infty$
$D_7 = 0.1035$, $N_5 = 1.80610$, $V_5 = 40.8$
$R_8 = -0.35198$
$D_8 = 0.0019$
$R_9 = 13.581$
$D_9 = 0.0581$, $N_6 = 1.80610$, $V_6 = 40.8$
$R_{10} = -0.93118$
$D_{10}$ = variable air space Rear group
$R_{11} = 9.1817$
$D_{11} = 0.0349$, $N_7 = 1.58913$, $V_7 = 61.0$
$R_{12} = -6.4864$ Back focal length = 0.71250
Focal length of the front group = 1.12580
Focal length of the rear group = 6.45738
S/L · f/fR = 0.1549, S/L = 1.0000, S = 0.3609

| Distance from the image plane to the object | 5.814 | |
|---|---|---|
| Magnification | 0 | 0.2878 |
| $D_{10}$ | 0.0039 | 0.3648 |
| Shifting length of the front group from the image plane | 0 | 0.3609 |

The following lists 3 and 4 indicate coefficient of Seidel's aberration respectively wherein the list 3 shows in case the object range is ∞, while the list 4 shows in case the object range is 5.814 (magnification = 0.2878).

List 3

| Surface number | I | II | III | P | V |
|---|---|---|---|---|---|
| 1 | 0.5469 | 0.1754 | 0.0562 | 0.5816 | 0.2045 |
| 2 | 0.0645 | −0.1972 | 0.6029 | −0.1692 | −1.3260 |
| 3 | 0.0427 | 0.0167 | 0.0066 | 0.8099 | 0.3204 |
| 4 | −0.3072 | 0.2893 | −0.2724 | 0.0017 | 0.2550 |
| 5 | −1.1581 | −0.4911 | −0.2083 | −1.3476 | −0.6598 |
| 6 | −3.6695 | 0.7069 | −0.1362 | −1.5984 | 0.3342 |
| 7 | 0.0401 | 0.0571 | 0.0813 | 0 | 0.1158 |
| 8 | 2.6779 | −0.1312 | 0.0064 | 1.2680 | −0.0624 |
| 9 | −0.0022 | 0.0185 | −0.1538 | 0.0329 | 1.0067 |
| 10 | 1.6849 | −0.3665 | 0.0797 | 0.4793 | −0.1216 |
| 11 | −0.2481 | 0.2702 | −0.2944 | 0.0404 | 0.2766 |
| 12 | 0.5526 | −0.3450 | 0.2154 | 0.0572 | −0.1701 |
| ε | 0.2245 | 0.0031 | −0.0165 | 0.1558 | 0.1732 |

List 4

| Surface number | I | II | III | P | V |
|---|---|---|---|---|---|
| 1 | 2.0392 | 0.3780 | 0.0701 | 0.5816 | 0.1208 |
| 2 | 0.0076 | −0.0471 | 0.2908 | −0.1692 | −0.7509 |
| 3 | 0.7784 | 0.1740 | 0.0389 | 0.8099 | 0.1897 |
| 4 | −0.3657 | 0.2715 | −0.2016 | 0.0017 | 0.1485 |
| 5 | −5.1072 | −1.2254 | −0.2940 | −1.3476 | −0.3939 |
| 6 | −7.4562 | 0.9315 | −0.1164 | −1.5984 | 0.2142 |
| 7 | 0.2637 | 0.1761 | 0.1176 | 0 | 0.0785 |
| 8 | 6.1243 | −0.1882 | 0.0058 | 1.2680 | −0.0391 |
| 9 | 0.0026 | 0.0150 | 0.0875 | 0.0329 | 0.7009 |
| 10 | 3.9104 | −0.5549 | 0.0788 | 0.4793 | −0.0792 |
| 11 | −0.2481 | 0.2208 | −0.1965 | 0.0404 | 0.1390 |
| 12 | 0.5526 | −0.2349 | 0.0998 | 0.0572 | −0.0667 |
| ε | 0.5016 | −0.0836 | −0.0193 | 0.1558 | 0.2617 |

FIGS. 6a, 6b, 6c, and 6d and FIGS. 8a, 8b, 8c, and 8d show corrected aberration relating to the second embodiment in case the object distance is ∞ and is 5.814 respectively wherein it can be understood that change of aberration comes to minimum as against variation of magnification. Furthermore it will clearly be understood that change of aberration in the foregoing lens comes to minimum at a range of close distance photography when it be compared with the reference aberration shown in FIGS. 10a, 10b, 10c, and 10d when focusing on the object distance 5.814 (in this case magnification comes to 0.2669) caused by shifting integrally the whole lens system as conventional manner without changing the distance between the front group and the rear group as shown in FIG. 3.

What is claimed is:

1. An aberration correcting lens system having large aperture ratios, comprising front convergent lens means including a diaphragm, rear lens means behind the front lens means in the path of light from an object and including a convergent lens, said front lens means being located closer to the object than said rear lens means and together forming an image on an image plane closer to the rear lens means, said convergent lens being moved closer to the object when said lens means together focus on objects at close range than when said lens means focus on objects further away, said lens means being movable relative to each other and being further from each other when the lens means together are focused on an object closer to the lens means than when the lens means are focused further away, whereby the change of aberration due to variation of magnification is corrected, and means gradually prolonging the distance between said lens means to focus on an object so that $0.10 < \Delta S/\Delta L \cdot f/fR < 0.20$, where $\Delta S/\Delta L$ is the ratio of the change in distance between the lens means and the change in distance of the front lens means to the image plane, fR is the focal length of the rear lens means, and f the focal length of the combined lens means.

2. An aberration correcting lens system, comprising a Gauss type lens having a large aperture ratio, said Gauss type lens including two doublet negative meniscus lens components having air exposed surfaces, said air exposed surfaces facing each other and having a diaphragm between them, one of said components being closer to the object being photographed and the other of said components being closer to the image being formed on an image plane, and positive lens means on the outer side of each of said doublet negative meniscus components, and focusing means for gradually prolonging the distance between the components and the position of one of the positive lenses in the one of said components closer to the image so that $0.10 < \Delta S/\Delta L \cdot f/fR < 0.20$, where $\Delta S/\Delta L$ is the ratio of change in the distance between the components and change in the positive lens relative to the image plane, f is the focal length of the combined lens components, and fR the focal length of the component closer to the image.

3. An aberration correcting lens system, comprising a Gauss type lens having a large aperture ratio and capable of focusing in a range of infinity to close-up, said Gauss type lens including two doublet negative meniscus lens components having air exposed surfaces, said air exposed surfaces facing each other and having a diaphragm between them and positive lens means on the outer side of each of said doublet negative meniscus components, and focusing means for gradually prolonging the distance between the rearmost positive component closer to the image and the front lens group arranged ahead of said rearmost positive component so that $$0.10 < \Delta S/\Delta L \cdot f/fR < 0.20$$

where $\Delta S/\Delta L$ is the ratio of change in the distance between the rearmost positive component closer to the image and the front lens group arranged ahead of said rearmost positive component and change in said group relative to the image plane, fR is the focal length of the said component closer to the image, and f is the focal length of the whole lens system.

4. An aberration correcting lens system, comprising a Gauss type lens having a large aperture ratio and capable of focusing in a range of infinity to close-up, said Gauss type lens including two doublet negative meniscus lens components having air exposed surfaces, said air exposed surfaces facing each other and having a diaphragm between them, and positive lens means on the outer side of each of said doublet negative meniscus components, and focusing means for shifting only the front lens group while the rearmost positive component is fixed relative to the image plane so that $$0.10 < \Delta S/\Delta L \cdot f/fR < 0.20$$

where $\Delta S/\Delta L$ is the ratio of change in the distance shifting only the front lens group while the rearmost positive component is fixed relative to the image plane and change in said group relative to the image plane, f is the focal length of whole lens system, and fR the focal length of the component closer to the image.

5. An aberration correcting lens system having a large aperture ratio, comprising front convergent lens means including a diaphragm and a rear convergent lens means positioned in the light path from the object to be photographed and arranged at the rear of said front convergent lens means further from the object being photographed than said front lens means and including at least one convergent lens, the distance between said two lens means being gradually prolonged further when the lens system is focused on the object to be photographed at a short range than when focused on the object to be photographed at a long range so as to satisfy the condition of $$0.10 < \Delta S/\Delta L \cdot f/fR < 0.20,$$

where $\Delta S/\Delta L$ is the ratio of change in the distance between said two lens means and between the front lens means and an image formation plane, $fR$ designates the focal length of the rear lens means and $f$ indicates the focal length of the whole lens system.

6. An aberration correcting lens system according to claim 5, wherein the rear lens means is shifted nearer to the object to be photographed when the lens system is focused on the object at a short range than when focused on the object at a long range.

7. An aberration correcting lens system according to claim 5, wherein the rear lens means is stationary relative to the image formation plane.

* * * * *